Feb. 10, 1970 J. S. CUBERT ET AL 3,495,100

THIN FILM MEMORY WORD LINE DRIVER

Filed Oct. 21, 1965

INVENTORS
JAMES J. MURPHY
JACK SAUL CUBERT

BY G. Donald Weber Jr.

ATTORNEY 3,495,100
Patented Feb. 10, 1970

3,495,100

THIN FILM MEMORY WORD LINE DRIVER

Jack Saul Cubert, Willow Grove, and James J. Murphy, Philadelphia, Pa., assignors to Sperry Rand Corporation, New York, N.Y., a corporation of Delaware Filed Oct. 21, 1965, Ser. No. 499,970
Int. Cl. H03k 1/00
U.S. Cl. 307—270 12 Claims

ABSTRACT OF THE DISCLOSURE

The invention relates to a circuit using storage diodes for generating fast rise time, narrow width pulses. A first diode is utilized across the input terminals for shaping the steep leading edge of an output pulse and a second diode is further employed in series with the input for developing a narrow pulse width and a steep trailing edge.

This invention relates to circuits which generate fast rise-time, narrow width pulses required for NDRO memories comprised of thin magnetic films, for example.

In ths device, thin magnetic films or similar elements are controlled by signals selectively applied thereto via drive lines or strips. The instant circuit utilizes charge storage diodes to operate on input signals to provide high speed, fast rise time leading edges thereof. A selectively operated gating arrangement transmits the fast rise time signal produced by the charge storage diode to the associated drive line. The signal is applied to the drive line for operation on the magnetic film elements for a time period determined by said gating arrangement.

Figure 1:
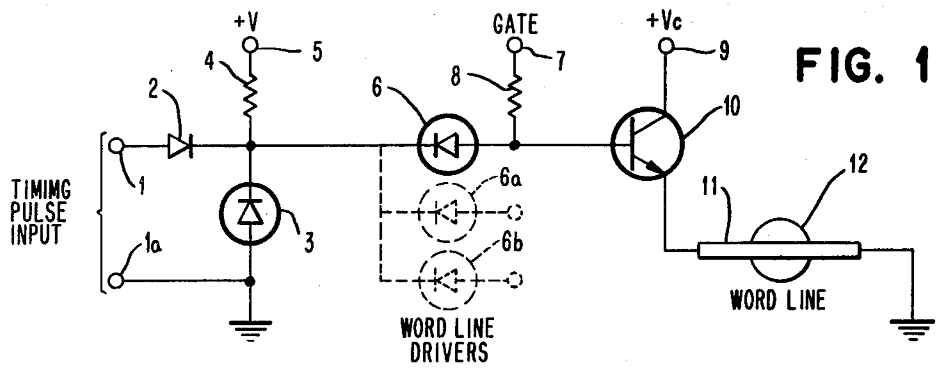
Figures 2, 3, 3A, 4:
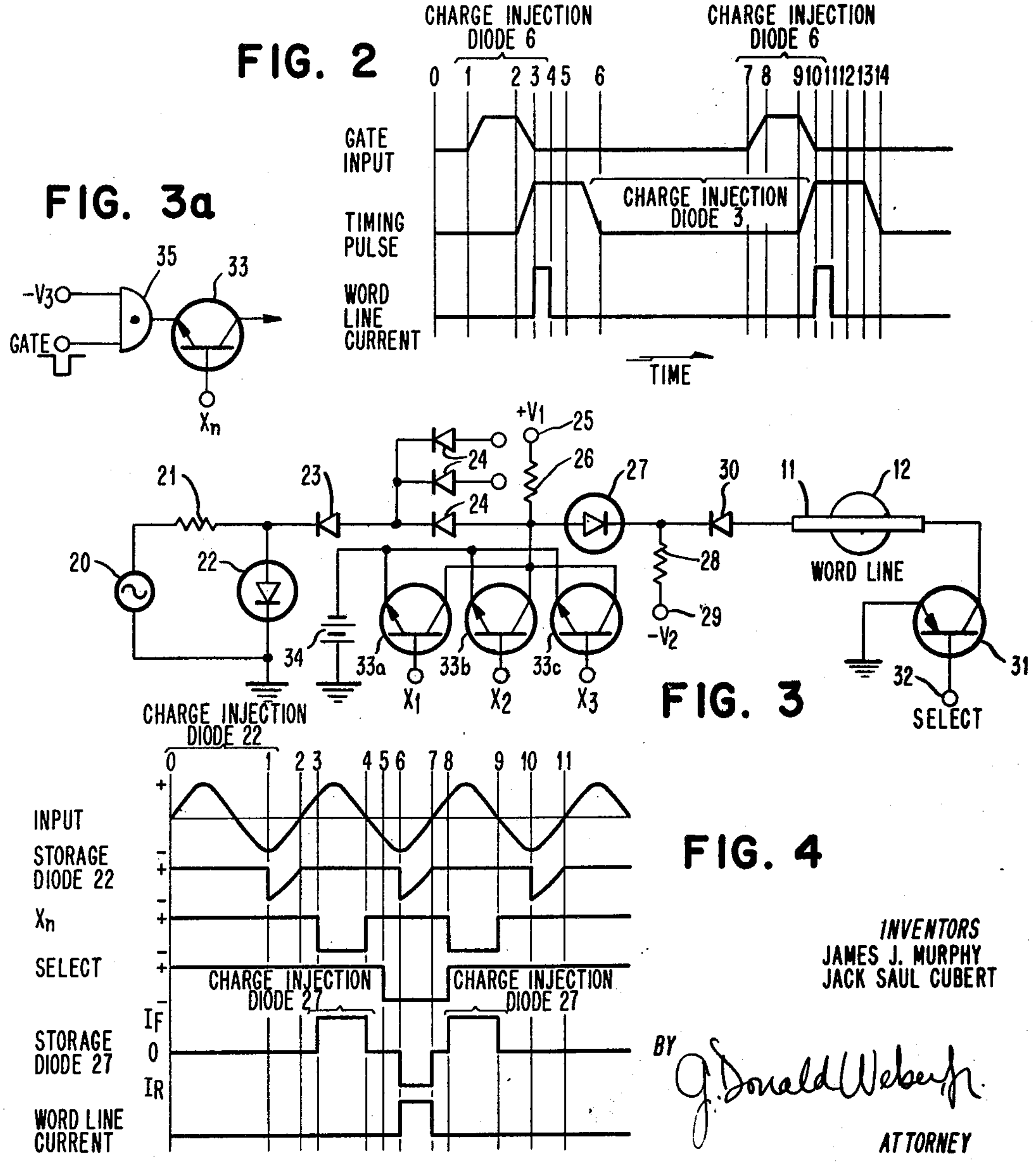

The objects and advantages of the circuits become apparent upon the review of the detailed description in conjunction with the drawings. FIGURE 1 is a schematic diagram of one embodiment of the invention. FIGURE 2 is a timing diagram of the pulses applied to and by the circuit shown in FIGURE 1. FIGURE 3 is a schematic diagram of another embodiment of the invention. FIGURE 3*a* is a schematic diagram of a switching arrangement which may be utilized in the circuit shown in FIGURE 3. FIGURE 4 is a timing diagram which shows the signals supplied to and by the circuit shown in FIGURE 3.

Referring now to FIGURE 1, an input signal is supplied at terminals 1–**1*a*. Input terminal 1 is connected to the anode of diode 2. The cathode of rectifier diode 2 is connected to the cathode of charge storage diode 3. The anode of charge storage diode 3 is connected to ground and to input terminal 1*a*. The current source (or sink) comprising potential source 5 and resistor 4, in series, is connected to the junction between the cathodes of diodes 2 and 3. Similarly, this junction is connected to the cathodes of charge storage diodes 6, 6*a*, 6*b* and the like. These charge storage diodes are the word line drivers. The word line driver diodes 6*a* and 6*b* are shown dashed to indicate that additional word lines may be connected to the single pulse shaping diode 3. In the embodiment shown, only a single word line is shown. The anode of charge storage diode 6 is connected, via coupling resistor 8, to the gate input source 7 which is capable of selectively supplying gate input signals. The junction between resistor 8 and diode 6 is connected to the base of NPN transistor 10. The collector electrode of transistor 10 is connected to a potential source 9. The emitter electrode of transistor 10 is connected to one end of a word line conductor 11 which is connected at the opposite end to ground or other suitable reference potential. A word line comprises a conductor 11 adjacent to and in magnetic coupling with one or more magnetic elements 12** in a manner known in the art.

In typical operation, a signal is supplied to the terminals

1–**1*a*. When the input signal is of relatively negative polarity, rectifier diode 2 is reversed biased and forward current flows through charge storage diode 3 from ground to the potential source 5. Thus, charge is stored in the lattice structure of diode 3. For example, referring to FIGURE 2, a timing pulse is supplied at the input terminals between time periods 2 and 6 and between time periods 10 and 14. During these times, diode 2 is forward biased. Between time periods 0 to 2 and 6 to 9, diode 2 is non-conductive and forward current flow through diode 3** exists thereby storing charge therein.

Upon reversal of the polarity of the input signal, rectifier diode 2 becomes forward conductive. Current flow through diode 2 is initially directed through storage diode 3 inasmuch as the reverse impedance of a charge storage diode is extremely small when stored charge is swept therefrom. When the charge is completely removed from storage diode 3, the diode becomes an effective high impedance whereby the potential at the cathode thereof rises rapidly (on the order of fractional nanoseconds) to a potental similar to that applied at terminal 1, less voltage drops. This potential is applied at the cathode of the word line driver charge storage diodes. Between time periods 1 to 3 and 7 to 10, a gate input pulse is supplied by source 7 via resistor 8 to charge storage diode 6. This gate input pulse causes forward current flow from source 7 through resistor 8, diode 6 and resistor 4 to source 5. Thus, during time periods 1–3 and 7–10 forward current and, therefore, charge storage exists in diode 6. During time periods 2–3, the transitional portions of the gate input signal and the timing pulse (which may be fractional nanoseconds) occur wherein, ideally, the condition in diode 6 remains substantially static. However, when the timing pulse supplied via rectifier diode 2 has become sufficiently positive, storage diode 3 switches as noted supra. Since charge has been stored in word line driver storage diode 6 by the gate input signal, the rapidly switching signal at the cathode of charge storage diode 6 produces a reverse current pulse (time periods 3–4) through diode 6. This pulse, of relatively positive polarity, is applied at the base of transistor 10. The positive going pulse turns on transistor 10 whereby source 9 is effectively connected to conductor 11 thereby producing a signal in the conductor. This latter signal is applied to the magnetic elements 12 associated with conductor 11. Of course, the pulse applied at the base of transistor 10 exists only so long as reverse current flow through diode 6 exists. The reverse current flow terminates (time period 4) as soon as the charge stored in the diode has been fully removed by the reverse current flow. That is, the width of the pulse applied to transistor 10 can be controlled by the amount of charge injected into diode 6 during time periods 6–9. Thus, diode 6 controls the width of the pulse in addition to the fall time of the pulse. Control of this pulse also controls the pulse supplied to the word line.

Thus, it is seen that the timing pulse input circuit produces extremely fast rise time signals which are connected for a predetermined duration via a positively gated channel to a transistor amplifier which provides a large signal to the word line conductor.

Another embodiment of the invention is shown in the schematic diagram of FIGURE 3. In FIGURE 3, a sinusoidal input source is applied, via resistor 21, across the electrodes of charge storage diode 22. Resistor 21 may, in fact, represent the internal impedance of the source 20. The cathode of charge storage diode 22 is connected to a suitable reference potential, for example ground. The common pulse generator (viz. charge storage diode 22) is connected via rectifier diode 23 to a plurality of word line driver diodes 24. Again, the number of word lines which may be driven is not limited to the number shown. However, for convenience, only a single word line conductor is indicated. The anode of word line driver diode 24 is connected via resistor 26 to source 25 which, in combination with resistor 26, provides a substantially constant current source. The current source is connected to the anode of charge storage diode 27. The cathode of diode 27 is connected via resistor 28 to potential source 29 which, in connection with resistor 28, provides a substantially constant current sink. The current sink is connected via rectifier diode 30 to word line conductor 11 which is associated with one or more magnetic elements 12. The other end of word line 11 is connected to the collector of PNP transistor 31. The emitter electrode of transistor 31 is connected to a suitable reference potential, for example ground. The base of transistor 31 is connected to a select terminal 32 to which selection signals may be selectively applied to provide a gating function.

Also connected to the common junction of the anode of rectifier diode 24 and storage diode 27, are the collector electrodes of transistors 33*a*, 33*b* and 33*c*. The emitters of these transistors are also connected, in common, via potential source 34 to ground. The base electrodes X1, X2 and X3 of transistors 33*a*, 33*b*, and 33*c* respectively are connected to specific drive lines to which signals may be selectively applied to perform an additional gating function.

The operation of this embodiment is readily understood by concurrent reference to FIGURES 3 and 4. The sinusoidal input signal supplied by source 20 causes the selective storage of charge (forward current) and the recombination of charge (reverse current) in storage diode 22. Upon the recombination, the potential at the anode of storage diode 22 becomes a negative or low level signal. For example, see time periods T1, T6 and T10 of FIGURE 4. This signal forward biases coupling diode 23. Similarly, when coupling diode 23 is rendered conductive, diode 24, in series with coupling diode 23 also tends to become forward biased. Thus, the application of a negative going signal at the cathode of diode 23 signals the possibility of current flow through diodes 23 and 24.

The current source comprising potential source 25 and resistor 26 is connected to the collector electrode of transistors 33*a*, *b* and *c*. These NPN transistors are normally maintained in the on or conducting condition by the application of a high level signal ($X_n$) applied at the bases of the transistors. When a signal of a negative or low level potential (for example time periods T3 or T8) is supplied to the bases for the transistors, the transistors are turned off. Thus, the current flow from source 25 to ground via resistor 26, transistor 33 and source 34 is interrupted. At this time, current flows from source 25 to sink 29 via resistors 26 and 28 and storage diode 27. This current is forward current relative to diode 27 and causes the storage of charge in the lattice structure thereof during time periods T3–T4 and T8–T9. Consequently, subsequent to the application of a signal $X_n$ to the base of transistor 33, the application of an input signal of a low level to the cathode of transistor 23 tends to cause a reverse current flow through storage diode 27. However, the current through storage diode 27 is limited by the magnitude of source 29 relative to the magnitude of the input signal plus the voltage drops across the several diodes.

Transistor 31 is normally maintained in the non-conductive condition through the application of a high level or positive potential at the base thereof at select terminal 32. However, as shown between time periods 5 and 8 (FIGURE 4), a low level or negative potential select signal may be applied thereto. This signal renders transistor 31 conductive. It is seen, that the application of a low level input signal subsequent to the application of an $X_n$ signal tends to permit reverse current flow in storage diode 27. However, in the alternative, when transistor 31 is nonconductive, current flow through conductor 11 and diode 30 is not possible. When, however, as shown during time periods 6 and 7 (FIGURE 4), an input signal is applied concurrently with a select signal subsequent to an $X_n$ signal, current flow may exist from the emitter electrode of transistor 31 through conductor 11 to source 20. This current flow causes a magnetic coupling between conductor 11 and thin magnetic film 12.

FIGURE 3*a* shows a modification of the circuit shown in FIGURE 3 wherein additional gating control may be effected. In the circuit shown in FIGURE 3*a*, transistor 33 has the collector directed toward a connection with the anodes of diodes 24 and 27. The base is connected to the $X_n$ selecting signal. The emitter electrode of transistor 33 is now connected to the output of gating circuit 35. The inputs to the gating circuit 35 may comprise a substantially constant potential source, for example a battery designated as V3, and a selectively supplied gating signal which is supplied at the gate input terminal. Thus, gating circuit 35 permits conduction by transistor 33 only upon the application of the selective gating signal. The selective gating provides, for example, an arrangement whereby power requirements may be reduced. In addition, additional selection between word line groups or the like may be obtained.

From the foregoing description, it will be understood that various changes may be made in the form, construction and arrangement of the parts, without departing from the scope of the invention, the form hereinbefore described being merely a preferred embodiment.

The embodiments of the invention in which an exclusive property or privilege is claimed are defined as follows:

1. The combination comprising, input signal supplying means, at least first and second charge storage diode means connected to said input means to selectively store and release said stored charge, said first diode being connected across said input means and said second diode being coupled in series with said input means and circuit means connected to receive signals from said second diode means after the release of its stored charge and only subsequent to the release of stored charge by said first charge storage diode.

2. In combination, means for supplying input signals having at least two levels, first charge storage means connected to said first named means for selectively storing charge therein when an input signal of one level is supplied and releasing said stored charge when an input signal of another level is supplied, second charge storage means connected to said first named means and said first charge storage means, pulse supplying means for selectively providing control signals to said second charge storage means for storing charge therein, amplifier means connected to said pulse supplying means and said second charge storage means, said amplifier means receiving signals from said first named means via said second charge storage means when releasing stored charge subseqeunt to the release of charge by said first charge storage means whereby the operating state of said amplifier means is altered, and means connected to said amplifier means are for receiving signls therefrom to produce a magnetic field for a predetermined time.

3. The combination recited in claim 2, wherein said last named means comprises a conductor which may be magnetically coupled to at least one magnetic element, and wherein said magnetic field is produced for a time predetermined to be in accordance with the charge release time of said second charge storage means.

4. A switching circuit comprising, input means, first charge storage means connected to said input means, second charge storage means connected to said first charge storage means in opposite sense relative thereto, coupling means connected between said first and second charge storage means, means for selectively supplying charge to said second charge storage means, conductor means adapted to produce a magnetic field therearound in response to a signal therethrough, unilateral conducting means connected between said conductor and said second charge storage means, and electronic switching means connected to said conductor to inhibit current flow therethrough.

5. The circuit recited in claim 4, wherein said means for selectively supplying charge includes current supplying means connected to said second charge storage means and switching means connected thereto for controlling the current flow produced thereby.

6. The circuit recited in claim 4 wherein said electronic switching means includes a transistor connected to an end of said conductor, and pulse supplying means connected to said transistor to selectively control the operation thereof.

7. A switching circuit comprising, input means, a first charge storage diode connected to said input means, a second charge storage diode connected in opposite sense relative to said first charge storage diode, first unilateral conducting coupling means connected between said first and second charge storage diodes, pulse source means for selectively supplying current to store charge to said second charge storage diode, conductor means adapted to produce a magnetic field therearound in response to a signal therethrough, second unilateral conducting means connected between said conductor and said second charge storage diode, and electronic switching means connected to said conductor to selectively inhibit current flow therethrough.

8. A driver circuit comprising, input signal supplying means, first charge storage diode means connected in parallel fashion to said input means to selectively store charge and release said stored charge in response to the input signal supplied thereto whereby a rapid rise time pulse is produced, second charge storage diode means connected in opposite polarity to said first charge storage diode means, and word line conductor means connected to receive signals from said input means in series fashion via said second charge storage diode means only subsequent to the release of stored charge by said first charge storage diode and adapted to be selectively magnetically coupled to magnetic elements adjacent thereto.

9. The driver circuit recited in claim 8, including, transistor means connected between said second charge storage diode means and said conductor means, said transistor means operable to amplify the signal passed via said second charge storage diode means.

10. The driver circuit recited in claim 8 including, means for selectively supplying current pulses to said second charge storage diode to store charge therein whereby reverse current may be selectively passed therethrough.

11. The driver circuit recited in claim 8 including transistor means connected at the free end of said conductor means to selectively inhibit current flow through said conductor means, and means for selectively supplying signals to said transistor to control the conduction state thereof.

12. In combination, means for supplying input signals having at least two levels, first charge storage diode means connected to said first named means for selectively storing charge therein when an input signal of one level is supplied and releasing said stored charge when an input signal of another level is supplied, second charge storage diode means connected to said first named means and said first charge storage diode means, pulse supplying means for selectively providing control signals to said second charge storage diode means for storing charge therein, amplifier means connected to said pulse supplying means and said second charge storage diode means, said amplifier means receiving signals from said first named means via said second charge storage diode means when releasing stored charge subsequent to the release of charge by said first charge storage diode means whereby the operating state of said amplifier means is altered, and means connected to said amplifier means for receiving signals therefrom to produce a magnetic field for a predetermined time.

References Cited

UNITED STATES PATENTS

| | | | |
|---|---|---|---|
| 3,356,998 | 12/1967 | Kaufman | 340—174 X |
| 3,385,982 | 5/1968 | Raillard et al. | 307—268 |
| 3,380,038 | 4/1968 | Cohler | 340—174 |

BERNARD KONICK, Primary Examiner

STEVEN B. POKOTILOW, Assistant Examiner

U.S. Cl. X.R.

307—246, 256, 281; 340—174